J. C. MILLER.
LID RETAINER.
APPLICATION FILED JULY 23, 1915.
1,207,974.
Patented Dec. 12, 1916.
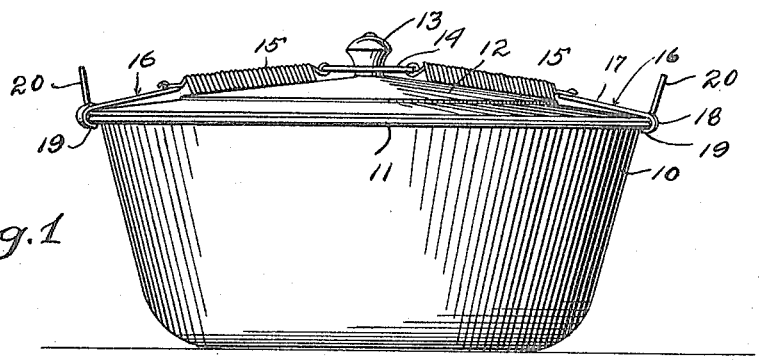
Fig. 1.
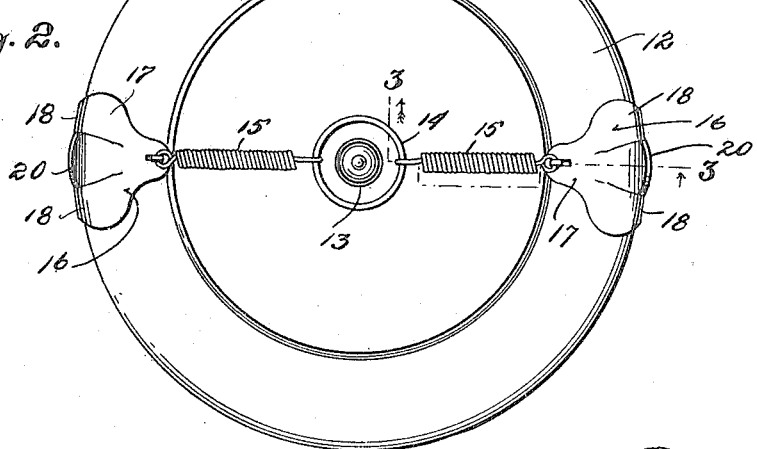
Fig. 2.
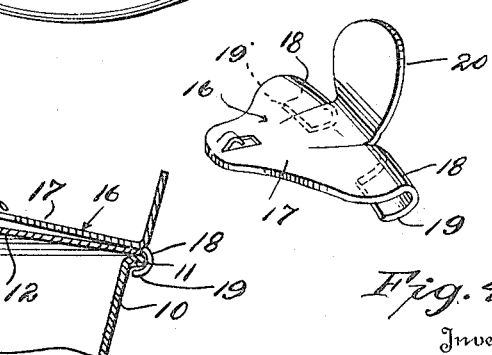
Fig. 3.
Fig. 4.
Witnesses
Inventor
J. C. Miller
By
Attorneys ated Dec. 12, 1916.
UNITED STATES PATENT OFFICE.

JACOB C. MILLER, OF OMAHA, NEBRASKA.

LID-RETAINER.

1,207,974.  Specification of Letters Patent.  Patented Dec. 12, 1916.

Application filed July 23, 1915. Serial No. 41,592.

*To all whom it may concern:*

Be it known that I, JACOB C. MILLER, a citizen of the United States, residing at Omaha, in the county of Douglas, State of Nebraska, have invented certain new and useful Improvements in Lid-Retainers; and I do hereby declare the following to be a full, clear, and exact description of the invention, such as will enable others skilled in the art to which it appertains to make and use the same.

This invention relates to improvements in cooking utensils.

The principal object of the present invention is to provide a simple and novel means for retaining the lid of a cooking utensil in position while pouring the hot water from cooked vegetables or the like.

Another object is to provide such a device that both hands of the user can be free to manipulate the vessel.

Another object is to provide a device for holding the lid of a cooking utensil which will automatically adjust itself to utensils of different diameters.

In the drawings: Figure 1 is a side elevation of a cooking vessel showing my improved lid holder in applied position. Fig. 2 is a top plan view of the same. Fig. 3 is an enlarged section on the line 3—3 of Fig. 2. Fig. 4 is a perspective view of one of the clips.

Referring particularly to the accompanying drawing, 10 represents the upper portion of a cooking vessel which is formed with the usual rolled rim 11. On the vessel is disposed the usual removable lid 12, provided with the central handle knob 13. Engaged around the knob, and resting on the lid is a ring 14 of any suitable material. Connected to this ring, at diametrically opposite points, are the inner ends of a pair of coil springs, formed of steel, brass, or the like, 15. At the outer end of each of the springs is movably secured a clip 16. Each of these clips is formed of a single piece of tin, steel, brass or the like, and includes a body portion 17, having laterally directed wings 18, from which are stamped a pair of downwardly and inwardly curved hook members 19. These hooks are adapted to embrace the edges of the lid together with the rolled rim of the vessel. Extending outwardly from a position between the wings is a finger 20 which is adapted to be grasped to lift the clip from engagement with the lid and vessel. This finger preferably is bent upwardly from the body portion so that a better action can be brought to bear on the springs to compress them when releasing the clips from the vessel.

Attention is called to the fact that the ring prevents the sudden contraction of the springs when either of the clips is released, thus rendering the use of the device safe.

It will thus be seen that the vessel can be more easily and conveniently handled than where one hand is required to hold the lid in position while pouring the hot water from the vessel which contains cooked vegetables or the like. The weight of the vegetables in the vessel will be sufficient to push the lid far enough from the mouth of the vessel to permit the water to flow freely therefrom. Thus the vessel can be manipulated with both hands.

What is claimed is:

1. In a device of the kind described, a pair of oppositely disposed hooks each having a pair of laterally spaced bills and an intermediate upstanding thumb piece, and a resilient connection between said hooks including a central boss surrounding element.

2. A lid holder for a cooking vessel comprising, a pair of oppositely extending coil springs, a ring connecting the inner ends of the springs and adapted for engagement on the central handle of the lid, and clips on the outer ends of the springs, each including a pair of hooks for embracing engagement with the rim of the vessel and the lid, and integral finger holds between the hooks.

In testimony whereof, I affix my signature, in the presence of two witnesses.

JACOB C. MILLER.

Witnesses:
 WALTER DEETS,
 P. J. MILLER.

Copies of this patent may be obtained for five cents each, by addressing the "Commissioner of Patents, Washington, D. C."